Aug. 27, 1957 L. E. SMOUS 2,803,854
NOZZLE AND SPRUE BUSHING FOR INJECTION MOLDING APPARATUS
Filed Nov. 1, 1954
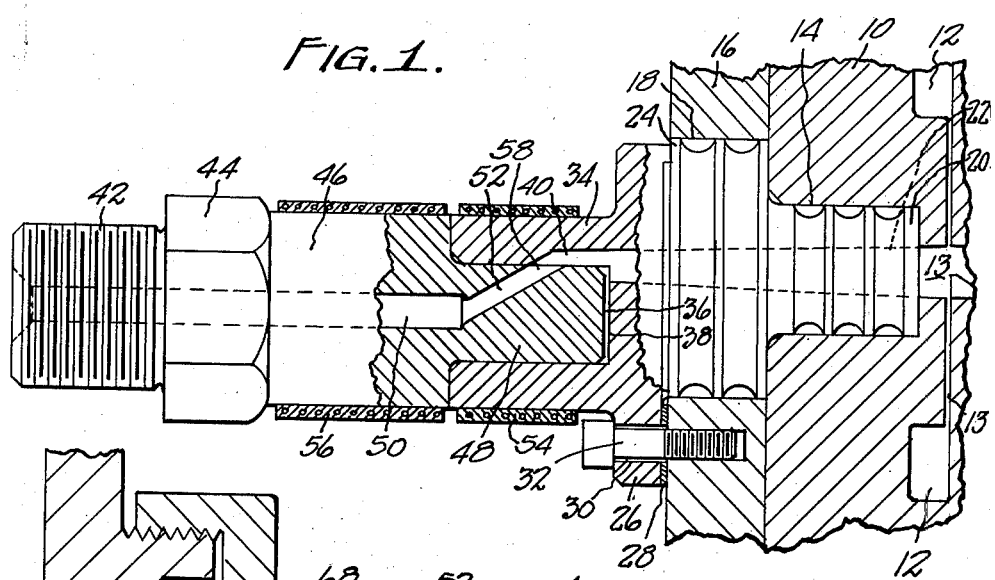
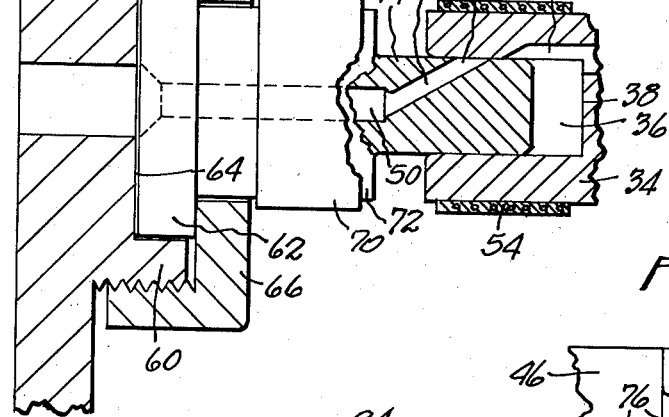
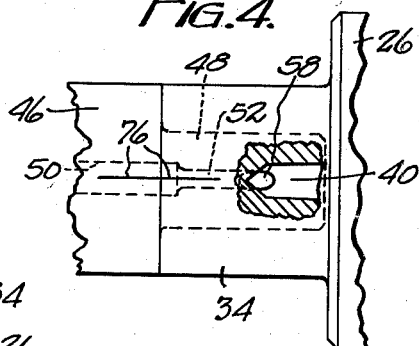
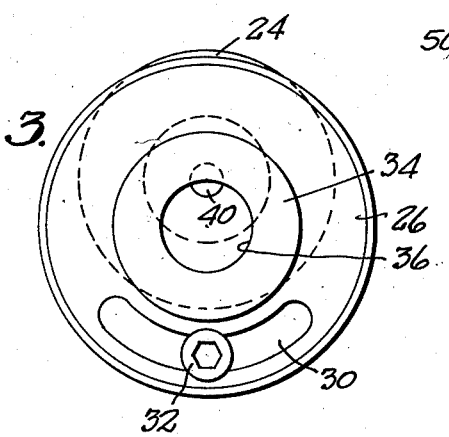
INVENTOR.
LEO E. SMOUS.
BY
Eugene C. Knoblock
ATTORNEY.

United States Patent Office

2,803,854
Patented Aug. 27, 1957

2,803,854

NOZZLE AND SPRUE BUSHING FOR INJECTION MOLDING APPARATUS

Leo E. Smous, Clay Township, St. Joseph County, Ind., assignor of one-half to Herbert J. Bowman, South Bend, Ind.

Application November 1, 1954, Serial No. 466,002

8 Claims. (Cl. 18—30)

This invention relates to improvements in nozzle and sprue bushing constructions for injection molding apparatus, and more particularly to apparatus for use in molding synthetic resins, such as nylon, which have a low viscosity at full heat.

Injection molding apparatus for the molding of nylon parts has been difficult to operate at desired efficiency because the low viscosity and resulting free flowing properties of the synthetic resin when at full heat have caused dripping, seepage or drooling from the nozzle into the mold while open between injection cycles. Such flow or drool frequently results in coating of the parting face of the mold with resin. This interferes with closing of the mold preparatory to the next molding and injection cycle. Also, it is a common cause of damage or injury to a mold. To meet and attempt to overcome this problem, it has heretofore been common practice to design the nozzles for handling synthetic resins of this type to be chilled in order to increase viscosity of the plastic and avoid or retard flow of synthetic resin into the mold while open.

Chilling of the resin in the nozzle between injection cycles to a point effective to reduce danger of flow or drool requires that the resin be at a temperature near the setting temperature thereof and introduces other problems, and particularly a problem of providing a molded plastic article of high quality. Thus it is necessary that the synthetic resin which flows into a mold cavity fill that cavity and this may not occur where the plastic has been cooled in the nozzle. In many instances where the article being molded is of such a character that the plastic flows in two or more divergent paths in the mold and these paths merge at a point remote from the sprue, there is serious danger of producing an imperfect molding with chilled plastic due to failure of the plastic to effectively merge and fuse at the part of the cavity remote from the sprue. In other words, in molding cavities which contain cores around which the synthetic resin must flow, the divergent flow streams may not merge fully at a point remote from the sprue, and the resulting casting or molding may contain imperfections, such as noticeable and objectionable "weld lines."

It is the primary object of this invention to provide a device of this character which is so constructed as to prevent dripping, drooling or seepage of synthetic resin into a mold between injection cycles by a positive mechanical valve action.

A further object is to provide a device of this character which is usable upon any mold by substitution for a conventional sprue bushing and nozzle.

A further object is to provide a device of this character having heating means associated therewith to maintain plastic in the nozzle in liquid free flowing state and condition during the period of time between injection feeding from the nozzle through the bushing into the mold, so that the resin will not become chilled but remains in free flowing state to insure optimum molding properties.

A further object is to provide a device of this character having a positive valve action to stop flow from the nozzle to the sprue bushing and means for heating said sprue bushing to facilitate removal of the sprue from the bushing upon opening of the mold and removal of the molded parts therefrom.

Other objects will be apparent from the following specification.

In the drawing:

Fig. 1 is a side view of the nozzle and sprue bushing assembly with parts thereof shown in section, the same being illustrated with the sprue mounted in a mold and with the parts in position for injection feeding therethrough;

Fig. 2 is a fragmentary view of a modified form illustrating the parts in cross-section and in sealed position between injection cycles;

Fig. 3 is an end view of the sprue bushing; and

Fig. 4 is a fragmentary side view with parts shown in section.

Referring to the drawing which illustrates the preferred embodiment of the invention, the numeral 10 designates a mold having molding cavities 12, passages 13 leading to the cavities and a bore 14 communicating with said passages. The mold may have a face plate 16 secured thereto and provided with a bore or hole 18. The bores 14 and 18 preferably are circular and coaxial, and, as illustrated, the bore 18 is of larger size than the bore 14. The mold may have liquid passages (not shown) for cooling thereof, as is conventional.

The sprue bushing has a tubular portion 20 provided with a bore 22 for communication with the mold cavity 12 when said tubular portion 22 fits snugly within the passage 14. An enlarged cylindrical portion 24 at the central part of the sprue bushing fits within the aperture 18 in the face plate 16. The portions 20 and 24 may have circumferential grooves to define insulating dead air pockets and to reduce heat transfer between the sprue bushing and the mold.

An enlarged flange portion 26, preferably circular as shown, is arranged eccentrically of and alongside the cylindrical portion 24. A portion of the flange 26 overlies the face plate 16 and a gasket 28 may be interposed between the flange 26 and the face plate 16. An arcuate slot 30 may be formed in the portion of the flange 26 projecting laterally from the cylindrical portion 24. A stud 32 screw-threaded in the face plate 16 passes through the slot 30 wtih its head bearing against flange 26 to clamp the sprue bushing in selected rotative position. A tubular socket portion 34 projects from the flange 26 preferably substantially concentric therewith and eccentric of the parts 20 and 24, as illustrated. The socket portion 34 has a bore 36 therein central thereof and eccentric of the bore 22 and terminating at an inner end wall 38. The bore 22 of the sprue bushing communicates with the bore 36 which terminates at the portion 40 extending partly through the socket wall 34 in a longitudinal direction.

The nozzle member is mounted upon a charge container of the injection molding apparatus, not shown, which is adapted to move it back and forth between feeding and mold unloading positions. In the form illustrated in Fig. 1, the nozzle has a threaded shank portion 42 for connection with the charge container of the injection molding apparatus. A polygonal tool-receiving portion 44 is formed adjacent the shank 42 and a neck 46 projects from the portion 44. A nozzle head portion 48, of reduced dimension and of cylindrical form to have a snug sliding fit within the bore 36 of the sprue bushing, is formed on the end of the nozzle. The nozzle has an axial bore 50 extending substantially centrally through portions 42, 44 and 46 thereof, and communicating with the compressor cylinder or charge container of an injection molding apparatus by means of which heated fluent synthetic resin material is subjected to pressure to cause it to flow through the nozzle and into the sprue bushing and the mold cavity. The passage 50 terminates adjacent the junction of the neck 46 and the head 48 of the nozzle, and at its inner end communicates with an inclined or obliquely extending passage 52 whose mouth opens at the periphery of the nozzle head 48 intermediate the length thereof, as illustrated. The bore 36 of the socket portion 34 of the sprue bushing and the outer peripheral surface of the nozzle head 48 are finished or polished for accurate snug sliding interfitting relation, and the end of the socket 34 of the sprue preferably has a sealing face contacting engagement with the shoulder of the nozzle between the neck 46 and the head 48 thereof.

If desired, heating means may be provided for the exposed or projecting parts of the nozzle and sprue bushing. Thus, as shown in Fig. 1, an electrical heating element 54 may encircle the tubular portion 34 of the sprue bushing, and similar electrical heating means 56 may encircle the neck 46 of the nozzle. Said heating means may take any form desired, and, as here shown, constitute electrical resistance wires imbedded in or carried by electrical insulation material, such as thermosetting resin, the same being formed as a ring in each instance to encircle the part on which it is mounted. By this means synthetic resin trapped in the nozzle between injection cycles is maintained heated, and the sprue of the molding is heated enough to permit it to be removed from the bushing along with the articles being molded and the "spider" between said sprue and said articles which is formed in mold passages 13.

The mold charging position of the nozzle and sprue bushing is illustrated in Fig. 1. In this position, the nozzle head 48 seats fully within the socket 36 of the tubular portion 34 of the sprue bushing with its shoulder bearing against the end of the sprue bushing socket 34. The mouth 58 of the oblique passage 52 in the nozzle head 48 registers with the end portion 40 of the bore or passage 22 of the sprue bushing. Consequently, there is a free flow path from the injection apparatus through passages 50, 52, 40 and 22 into the mold cavity 12. When the mold charging operation has been completed, the nozzle unit is moved to the position illustrated in Fig. 2, in which its head 48 is withdrawn partially from the socket portion 34 of the sprue bushing so that its mouth 58 is out of register with and out of communication with the bore portion 40 in the sprue bushing and a valve action occurs in which the mouth 58 of the passage 52 of the nozzle is seated by the bore 36. This valve action provides a positive mechanical cut-off action, and enables separation of the molding sprue from the sprue bushing upon release of the molded part from the mold. The amplitude of movement of the nozzle is so related to the dimensions and proportions of the depth of the bushing socket 34 and the length of the nozzle head 48 that the mouth 58 will remain within the socket 34 while the standby or inoperative condition of the nozzle continues. It will therefore be apparent that the nozzle head 48 and the sprue bushing socket 34 constitute interfitting valve parts which effectively cut off all flow of fluent injection material between injection cycles. This effectively eliminates drooling and leakage of the plastic material from the nozzle into the mold even while it remains in a highly fluent condition characterized by low viscosity as a result of heating thereof by the heating elements 54 and 56. Elimination of leakage and drooling avoids loss of the plastic material, avoids down time required to clean the apparatus and remove accumulated drippings or seepage; and, more importantly, prevents the formation of flash on the parting faces of the mold which would tend to prevent free closing of the mold to injection position in which the nozzle and sprue bushing again assume the position seen in Fig. 1.

Fig. 2 illustrates not only the valved position of the parts but also illustrates the manner in which an unthreaded nozzle may be employed. In this instance a screw-threaded neck or sleeve 60 is formed on the charge chamber or cylinder or associated injection apparatus of the molding device. The base flange 62 of a nozzle fits in said sleeve and bears against a gasket 64. A draw nut 66 has a screw-threaded connection with sleeve 60 and has a flange 68 which presses against the nozzle flange 62 to press it into sealing engagement with gasket 64. A heater ring 70 preferably fits removably around the shank 72 of the nozzle adjacent nozzle head 74 adapted for insertion within the sprue bushing socket. By this construction, proper alignment of parts to provide communication of the passages of the nozzle and the sprue bushing, as indicated by aligned scribe marks 76 (Fig. 4), may be effected by rotating the nozzle while the draw nut 66 is loose, and then holding the nozzle in adjusted position while draw nut 66 is tightened.

It is apparent from a consideration of the constructions herein illustrated and described that the present device forms effective means for injecting synthetic resin into an injection mold. Also it is apparent that the device is usable on any mold and that there is no requirement for special construction of a mold in order to receive or accommodate the device. The device also makes possible the maintenance of a synthetic resin within the nozzle at a fluent state so as to avoid chilling thereof which might tend to start setting thereof which would interfere with subsequent injection. Also, maintaining the resin heated in the nozzle avoids defective moldings due to incomplete filling of the cavity and imperfect fusing of the plastic at the parts of the mold cavity remote from the sprue. These conditions are particularly important for the molding of nylon. Nylon presents problems in molding due to very low viscosity when at molding or fluent state. This device effectively overcomes the difficulties heretofore commonly experienced in the molding of nylon parts and in the molding of parts formed from other materials possessing the same property of low viscosity when heated.

While the preferred embodiments of the invention have been illustrated and described herein, it will be understood that changes in the construction may be made within the scope of the appended claims without departing from the spirit of the invention.

I claim:

1. The combination with injection molding apparatus including a pressure chamber containing the material to be molded and a mold member having a mold cavity and an opening leading thereto, said chamber and mold being relatively shiftable, of a nozzle fixedly carried by and projecting from said chamber and having a passage therethrough, and a sprue bushing mounted fixedly in said mold opening and projecting therefrom and having a passage therethrough, said nozzle and sprue bushing including parts fitting slidably one within the other, one of said parts constituting a socket having a bore offset laterally from and communicating with the associated passage at a point spaced from the mouth of said socket, the other part constituting a head having a snug fit in said socket, said head having a lateral opening therein leading from the associated passage and spaced from its end, the passages of said nozzle and bushing communicating in one operative interfitting position and being spaced to shut off flow therebetween in another interfitting operative position.

2. The combination with an injection molding apparatus having relatively shiftable parts including a container for material to be molded and a mold having a mold cavity, of a nozzle fixedly carried by said container and including a head portion projecting from said container, said nozzle having a passage therethrough communicating with said container and terminating in a lateral portion having its mouth located at the periphery of said head spaced from the end of the head, and a sprue bushing fixedly mounted in said mold and having a socket slidably receiving said nozzle head with a snug fit, said bushing having a passage communicating with said mold cavity and eccentric of and communicating with said socket spaced from the outer end of said socket, said head and bushing having a first operative position in which the passages thereof communicate and a second operative position in which said nozzle is retained in said socket with the outer portion of said socket sealing and spanning the lateral portion of said nozzle passage.

3. The combination defined in claim 2, and a heater encircling said socket.

4. The combination defined in claim 2, wherein a neck portion of said nozzle mounts said head and projects from said container, and a heater encircling said nozzle neck.

5. The combination defined in claim 2, wherein said bushing is circular and rotatively adjustable, and means for locking said bushing in selected rotative adjustment on said mold.

6. The combination defined in claim 2 wherein said bushing includes a flange bearing against said mold and having an arcuate slot, and a bolt carried by said mold and extending through said slot, said bolt having an enlarged head bearing on said flange.

7. A nozzle and sprue bushing unit for use with an injection molding machine having a storage container and a mold which are relatively shiftable, said nozzle having a cylindrical head portion and a passage therethrough having a mouth open at the periphery of said head intermediate the length thereof, said sprue bushing having a passage therethrough and a nozzle-receiving socket having a cylindrical bore eccentric of and communicating with said passage intermediate its length, means fixedly mounting said nozzle and sprue on said container and mold, said nozzle head having a snug sliding fit in said socket and shiftable between an interfitting position in which its passage mouth communicates with said bushing passage and an interfitting position in which said passage mouth is spaced from said bushing passage and is sealed by said socket.

8. A nozzle and sprue bushing unit as defined in claim 7, and a heating member carried by said bushing socket and a heating member carried by said nozzle adjacent to its head.

References Cited in the file of this patent

UNITED STATES PATENTS

| 2,565,522 | Renier | Aug. 28, 1951 |
| 2,617,151 | Rubin | Nov. 11, 1952 |

FOREIGN PATENTS

| 1,030,255 | France | Mar. 11, 1953 |